United States Patent [19]

Teng

[11] Patent Number: 4,771,902

[45] Date of Patent: Sep. 20, 1988

[54] SEALER-TYPE CONTAINER AND DISPLAY MEANS

[76] Inventor: Hsieh-Yih Teng, P.O. Box 10160, Taipei, Taiwan

[21] Appl. No.: 43,802

[22] Filed: Apr. 29, 1987

[51] Int. Cl.[4] .......... A01G 5/04; A47G 7/02; B65D 23/12; B65D 39/04

[52] U.S. Cl. .......... 215/1 R; 215/2; 215/227; 215/354; 206/45.34; 47/41 R; 47/41.13; 40/407; 40/410; 428/13; 362/101

[58] Field of Search .......... 215/1 R, 2, 355, 227, 215/354; 362/101; 47/41 R, 41.12, 41.13; 40/407, 410; 206/45.34, 457; 428/11, 13

[56] References Cited

U.S. PATENT DOCUMENTS

| | | | |
|---|---|---|---|
| Re. 20289 | 3/1937 | Simpson | 47/41.13 |
| 1,681,040 | 8/1928 | Kemp | 215/1 R X |
| 2,155,811 | 4/1939 | Tredup | 47/41.13 |
| 2,174,771 | 10/1939 | Bender | 47/41.12 |
| 2,226,950 | 12/1940 | Simpson | 47/41.13 |
| 2,332,352 | 10/1943 | Smith | 47/41.13 |
| 2,361,423 | 10/1944 | Snyder | 40/410 |
| 2,361,424 | 10/1944 | Snyder | 215/1 R |
| 2,361,425 | 10/1944 | Snyder | 215/1 R |
| 2,435,612 | 2/1948 | Snyder | 215/1 R X |
| 2,601,658 | 6/1952 | Bussert | 47/41.12 |
| 2,704,100 | 3/1955 | Freeman | 215/355 X |
| 2,709,217 | 5/1955 | McCluskey | 362/101 |
| 3,405,830 | 10/1968 | Hayashida | 215/355 X |
| 3,765,995 | 10/1973 | Perrin | 215/2 |
| 4,094,429 | 6/1978 | Urbin | 215/354 X |
| 4,221,078 | 9/1980 | Latham et al. | 47/41 R |

FOREIGN PATENT DOCUMENTS

| | | | |
|---|---|---|---|
| 993831 | 7/1951 | France | 215/355 |
| 994773 | 8/1951 | France | 362/101 |
| 1111688 | 11/1955 | France | 47/41.13 |
| 507483 | 6/1939 | United Kingdom | 47/41.13 |

*Primary Examiner*—William Price
*Assistant Examiner*—Sue A. Weaver

[57] ABSTRACT

A container has a bottleneck inversely mounted on a base packed by a bell-shape sealer made of elastomer material, of which the sealer includes plural annular extension rings concentrically circumferentially formed on an inside wall of the sealer, adapted to be turned up along the bottleneck to pack the bottle-neck tightly in a base when inversely mounting the container on the supporting base.

1 Claim, 3 Drawing Sheets

SEALER-TYPE CONTAINER AND DISPLAY MEANS

BACKGROUND OF THE INVENTION

W. M. Snyder disclosed a "Crystal Novelty and Paperweight" in his U. S. Pat. No. 2,435,612 patented Feb. 10, 1948, which provides a structural arrangement for mounting a figure with a liquid filled container and however has the following defects:

1. In order to prevent the liquid leakage from the glass container, several elements such as the gasket, the lowest disk and the screw-threaded closure cap must be used all together to tightly seal the liquid within the container to thereby increase its production complexity and installation cost, as well as maintenance diffculties.

2. A supporting base is further required to dispose around the closure cap to finish its outer appearance, which needs an additional adhesive or packing filled or inserted between the cap and the outer base, to also increase its production cost.

3. Even the annular instruck portion (4*b*) of its closure cap may bear directly against the disk-like member for tighly sealing the gasket (7), the gasket after being tighly squeezed may gradually restore the closure cap by its internal stress along the screw threads of the bottle neck to finally loosen the cap to cause fluid leakage from the container. The present inventor has found these defects and invented the present container and display means.

SUMMARY OF THE INVENTION

The object of the present invention is to provide a container and display means including a container, a bell-shape sealer centrally mounted with a decorative article sealing the bottleneck of the container, and a base supporting the container, wherein the sealer is made of elastomer materials and is turned up along the bottleneck to be inserted in a hole formed on the base for its convenient assembly or disassembling.

DETAILING DESCRIPTION

Figure 1:
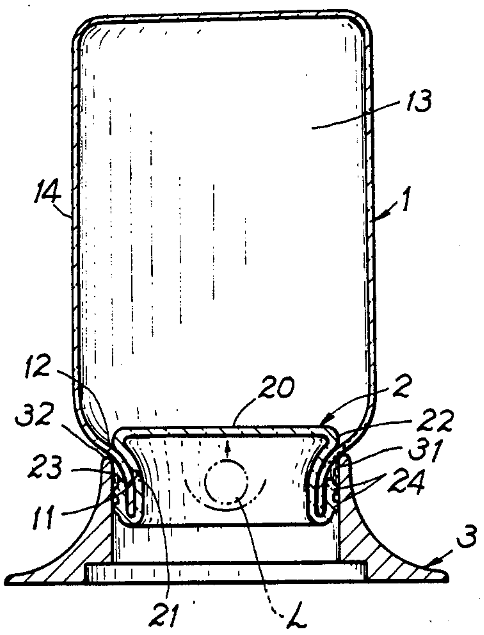
FIG. 1 is a sectional drawing of the present invention.
Figure 2:
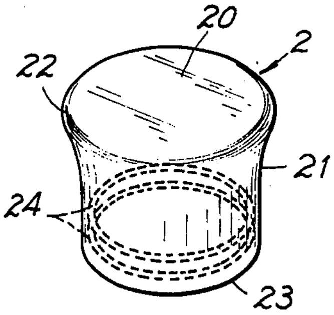
FIG. 2 shows a bell-shape sealer of the present invention.
Figure 3:
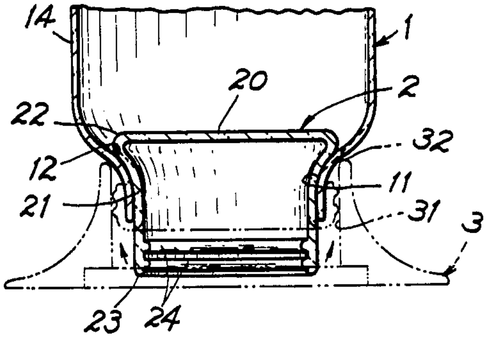
FIG. 3 shows a turn-up operation of the sealer to be fixed in a base in accordance with the present invention.

As shown in FIGS. 1-3, the present invention comprises: a container 1, a bell-shape sealer 2 sealing a bottleneck 11 of the container 1, and a base 3 supporting the container 1 as packed by the sealer 2.

The container 1 is preferably made of glass or transparent materials such as transparent acrylic plastic, polycarbonate, etc. and includes a bottoleneck 11 having a diameter smaller than that of a barrel portion 14 of the container shaped as a cylinder or a sphere, an arcuated taper portion 12 convergently formed between the barrel portion 14 and the bottleneck 11. After filling a liquid 13 into the container 1, the sealer 2 is provided to seal the bottleneck 11 and then the container is inverted to allow the bottleneck 11 to be mounted on the base 3.

The bell-shaped sealer 2 includes: an upper circular portion 20 having an upper flange 22 formed on a periphery of the upper circular portion 20, a cylindrical skirt 21 convergently formed downwardly from the upper circular portion 20 having a diameter smaller than that of the circular portion 20 and having a height equivalent to a double length of the height of the bottleneck 11 so that the lower half portion of the skirt 21 can be turned up along the bottleneck 11 to be inserted in a cylindrical hole 31 formed on a central portion of the base 3, and plural annular extension rings 24 circumferentially and concentrically formed on the inside wall of the cylindrical skirt 21 near the lowest opening 23 of the sealer as shown in dotted line of FIG. 2 which can then be turned up as shown in dotted line of FIG. 3. The sealer 2 is made of elastomer materials such as rubber or resilient plastic materials. The upper flange 22 is operatively engaged with the arcuated taper portion 12 of the container 1. As shown in FIG. 1, the sealer 2 may be made of transparent rubber to allow a lamp L positioned under the sealer 2 illuminating the internal liquid 13 or particles as filled in the container 1 through the transparent sealer 2. Naturally, the sealer 2 can be made of opaque materials when a spot light is used outside the container 1 to illuminate the container 1.

After turning up the lower portion of the cylindrical skirt 21 as shown in FIGS. 3 and 1 to dispose about the inner and outer sides of the bottle neck 11, the plural extension rings 24 will be turned outwardly and upwardly to be packed between the bottleneck 11 and the wall of the cylindrical hole 31 inside the base 3 to tightly frictionally mount the container 1 on the base 3 as retained by a top edge 32 formed on the upper rim of the base 3. When turning up the lower half portion of the cylindrical skirt 21 outwardly and upwardly along the bottleneck 11, the elastomer sealer 2 will be pulled or stretched to allow the sealer surface closely contacting the bottle-neck 11 to further prevent from liquid leakage therethrough.

Accordingly, the present invention can provide multiple sealing purposes which include a first sealing by the upper flange 22 engaged with the arcuated taper portion 12, a second sealing occurring as the closer contact between the stretched elastomer sealer 2 and the container surfaces, and a third sealing provided by the plural annular rings 24 as packed between the neck 11 and the base 3.

Figure 4:
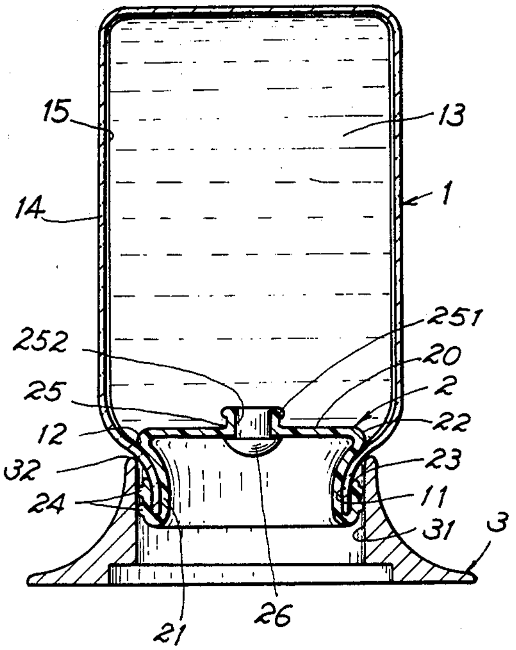
FIG. 4 shows another preferred embodiment of the present invention.

The sealer 2 may also be formed with a central extension 25 extending upwardly from the central portion of the upper circular portion 20, which is formed with an extension ring 251 on the uppermost rim of the extension 25 and formed with a central through hole 252 through the extension 25 adapted for the insertion of a sealing plug 26, as shown in FIG. 4.

Figure 5:
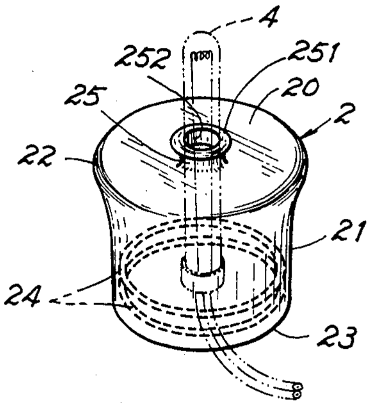
FIG. 5 shows still another preferred embodiment of the present invention.
Figure 7:
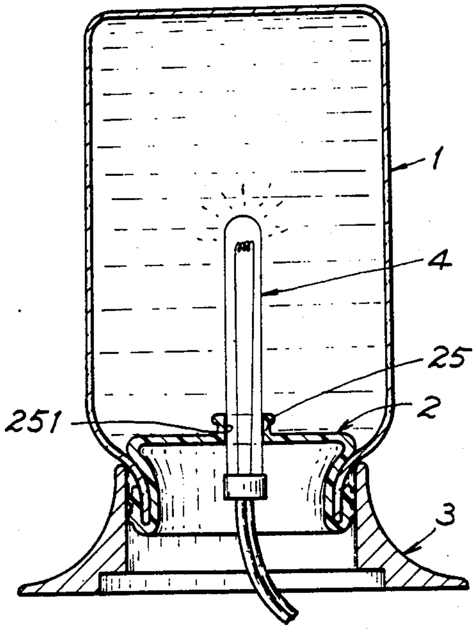
FIG. 7 shows a sectional illustration of the present invention based on FIG. 5.

The central extension 25 may be inserted with an illuminating lamp 4 through the hole 252 as shown in FIGS. 7 and 5 when removing the plug 26 so as to illuminate the liquid 13 as filled in the container 1 to thereby serve for display purpose for clearly showing internal chemical, medicine or food liquid.

Figure 6:
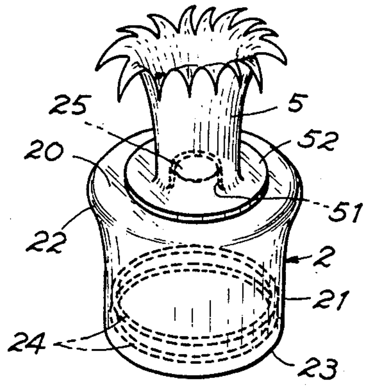
FIG. 6 shows further preferred embodiment of the present invention.
Figure 8:
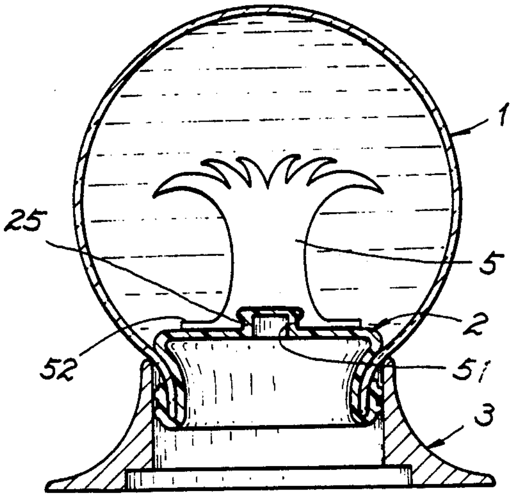
FIG. 8 is an illustration of the present invention based on FIG. 6.

As shown in FIGS. 6 and 8, the central extension 25 is formed with an extension ring 251 thereon, but without forming the central through hole 251 (having closed top portion) and a decorative article 5, selected from a figure, figurine, flower, animal or any other demonstrating object having a socket 51 formed on its bottom engageable with the central extension 25 and extension ring 251 and a bottom plate 52 stably laying on the upper portion 20 of the sealer 2, is fixed on the extension 25 so as to form a decorative crystal or serve for any other display purposes.

The present invention has the following advantages superior to a conventional display container:

1. The bell-shape sealer 2 serves like a flip-flap and can be easily turned up to be tightly packed between the bottleneck and the base; or can be quickly dismantled from the base and container for replacing the inner decorative article 5 or liquid 13.

2. The sealer has three sealing functions or positions such as: the upper flange 22, the plural rings 24 and the close contact of the sealer 2 with the container surfaces, which can eliminate or reduce the complex tightening or bonding measures as conventionally applied to fix a glass container on a base.

3. The lower production cost, operation easiness, and minor maintenance problems can be achieved by this invention.

For further protecting the glass container 1, an inner lining made as a transparent film 15 can be coated on the inside surface of the container 1.

I claim:

1. A sealer-type container and display means comprising: a container for filling liquid therein having a bottleneck tapered from a barrel portion defining an arcuated taper portion therebetween; a bell-shape sealer having an upper circular portion formed with an upper flange on its periphery engageable with said taper portion of said container, a cylindrical skirt convergently formed under said flange, plural annular extension rings formed on the inside wall of said skirt adapted to be turned up to pack said bottleneck in a base, and a central extension formed on said upper circular portion of said sealer having a closed top portion and an extension ring formed on the upper rim of said central extension, and a decorative article having a socket formed on the bottom of said decorative article engageable with said extension ring of said central extension and having a bottom plate of said decorative article laid on said upper circular portion of said sealer; and a base having a cylindrical hole adapted to fictionally mount said bottleneck therein as packed by said sealer when inverting said container as retained by a top edge of said base.

* * * * *